United States Patent [19]

Beath et al.

[11] 3,967,024

[45] June 29, 1976

[54] FROZEN FISH PACKAGE

[75] Inventors: Laurence R. Beath, Kenogami; Alexander M. Vessie, Lachute, both of Canada

[73] Assignee: The Price Company Limited, Quebec, Canada

[22] Filed: Mar. 18, 1974

[21] Appl. No.: 451,971

[52] U.S. Cl. .................................. 428/155; 428/486; 428/321; 428/332; 428/342; 229/3.1; 229/3.5 R; 426/127; 427/245; 427/271; 427/276; 427/277; 427/278

[51] Int. Cl.[2] .......................................... B32B 3/26

[58] Field of Search ........... 117/11, 135.5; 427/245, 427/271, 277, 278, 288; 161/159, 164; 428/136, 155, 304, 320, 321, 332, 342, 486; 426/127, 129, 106; 229/3.1, 14 BL, 3.5 R

[56] References Cited

UNITED STATES PATENTS

| | | | |
|---|---|---|---|
| 1,148,783 | 8/1915 | Knappstein | 117/11 X |
| 1,368,080 | 2/1921 | Van Sluys | 117/11 |
| 2,379,846 | 7/1945 | Wilsey et al. | 229/3.1 X |
| 2,697,664 | 12/1954 | Goeser et al. | 117/135.5 X |
| 2,963,381 | 12/1960 | Leimbacher | 117/11 X |
| 3,143,434 | 8/1964 | Tennant | 117/135.5 X |
| 3,602,422 | 8/1971 | Dewhurst | 229/3.5 |
| 3,690,923 | 9/1972 | Vessie | 117/135.5 X |

FOREIGN PATENTS OR APPLICATIONS

| | | | |
|---|---|---|---|
| 760,959 | 6/1967 | Canada | 428/136 |

*Primary Examiner*—Ronald H. Smith
*Assistant Examiner*—Evan K. Lawrence
*Attorney, Agent, or Firm*—Alan Swabey & Co.

[57] ABSTRACT

A packaging folder formed from a paperboard coated on both surfaces with a coating resistant to water and water vapor, the coating so fractured to be pervious to air but substantially impervious to water. A process by which the coating layers are fractured to give the desired air permeability and water resistance by passing the coated folder around small diameter rollers.

6 Claims, 9 Drawing Figures

FROZEN FISH PACKAGE

FIELD OF THE INVENTION

The present invention relates to packaging material and a process for making it.

The material of the invention is particularly adapted to packaging foods, for example fish, to be frozen under pressure, the reason being that the packaging material permits the escape of air from the package while preventing loss of moisture and preventing adhesion of the frozen contents to the package walls. The present invention also relates to a process for producing such a packaging material.

DESCRIPTION OF PRIOR ART

In the manufacture of breaded fish sticks, the first step is to quick freeze large blocks (approx. 15 lb.) of fresh fillets. In this step, two coated fibrous board folders are placed in a metal pan which serves as a back-up to hold the folders rigidly. Preweighed lots of fish fillets are placed in each folder, which is then closed to provide a carton enclosing the fillets. In quick freezing, the folder-pan assembly, along with others, is placed between the platens of a quick freezing press where it is subjected to pressure and low temperature simultaneously by which the fish mass is first compacted and then frozen into a dense block. Following this operation, the blocks in their folders are placed in sub-zero storage. When required, the folders are stripped from the frozen fish blocks and each block is cut into sticks (approx. 1 inch × 1 inch × 3 inches) by means of a band saw. The fish sticks are then coated with batter and bread crumbs, semi-cooked in fat, cooled, packaged and returned to freezer storage ready for future distribution to sales outlets as required. During the semi-cooking, the fish component remains largely in the frozen state while the batter and crumbs become cooked.

With the conventional waxed paperboard folder which has an uninterrupted or continuous flat wax surface, air present in the mass of fish fillets is not always completely squeezed out during the pressing operation. Instead, the folder acts as a barrier to the escape of air which remains entrapped in and about the fish mass forming voids of various sizes in the frozen block. These voids cause imperfect surfaces and substandard weight in some of the ultimate fish sticks giving rise to rejects and economic loss.

The problem of removing air from fish blocks is one that is long standing and well recognized. One suggested solution is found in Canadian Pat. No. 726,545 covering a frozen food package the inner surface of which is embossed with spaced-apart depressions which are alleged to "constitute the said interior surface an escape path to the edge of the package for air". It is contended that these depressions are not sealed from one another by the (say) fish under pressure and that air is enabled to flow from one depression to another until it can find egress at a corner of the package. Another suggested solution is found in Canadian Pat. No. 910,735. This involves the use of an air permeable silicone treatment on the inside surface of the package. By this treatment, air can be expressed through the silicone treated surface but due to surface tension effects, fluid water is retained in the fish block. Also, because silicone is a release agent, adhesion of the frozen fish to the package is inhibited.

SUMMARY OF INVENTION

The product of the invention is a new form of air permeable folder capable of allowing air, but not water, to escape from the mass of fish during the compression period of the quick freezing operation. The folder's construction generally is similar to the conventional folder in that it is composed of a fibrous paperboard substrate coated on both faces with a material impermeable to water, and water vapor. By suitable means, the coatings on both faces are cracked or fractured extensively. The fractures are extremely fine and appear as rows of faint irregular lines extending in somewhat broken fashion across the face of the folder. The degree of fracturing is such as to give adequate release or voiding of air during the freezer compression cycle and yet not allow excessive rate of dessication in the frozen fish block during freezer storage.

The process of the present invention, by which the product of the invention may conveniently be made, is operated to convert a cut and creased fibrous paperboard folder blank to form the desired coated air-permeable, water impermeable folder. The process comprises passing the folder blank through a unit which applies to both surfaces of the folder blank a layer of molten wax. The molten wax is then hardened, usually by cold water quenching. Both of these steps are conventional in the packaging field. The novel feature of the process, according to the invention, is the next step in which the folders, with their hardened wax coating, are conveyed around one or more small diameter rolls. The folders are constrained to follow the curvature of the small diameter rolls through a substantial angle. Bending the folders around the small diameter rolls causes compression stresses in the folder face nearest the roll surface. These stresses cause miro-fracturing of the wax coating. The degree of micro-fracturing can be regulated by such factors as roll diameter and the number of rolls. The micro-fractures so produced are fine enough that surface tension bars the passage through them of fluid water but are large enough, and of sufficient number, to permit the desired outflow of air in the use of the folder in the compression freezing operation.

The coating-fracturing step of the process according to the invention is usually better done by passing the folder blank around two small diameter rolls in such a manner that first one, and then the other surface of the folder is subjected to the described flexural compressive stresses. In some cases, the folders may be passed around more than two small diameter rolls.

The flexing used to fracture the wax coating may leave the folders with an undesirable curvature. In such cases, a variant of the process includes the added step of passing the folders around another roll, which may be of larger diameter than the preceding rolls, to remove the curvature and produce a flat folder.

DESCRIPTION OF DRAWINGS AND PREFERRED EMBODIMENTS

The invention is illustrated in the following drawings showing preferred embodiments and in which.

Figure 1:
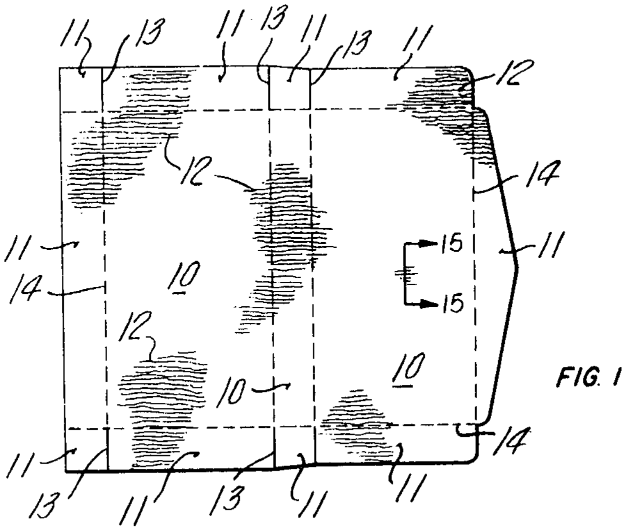
FIG. 1 is a plan view of a fractured packaging folder blank according to the invention.
Figure 2:
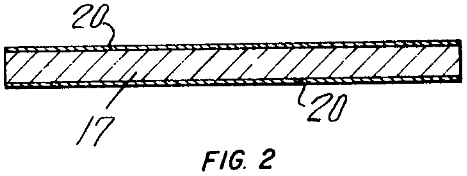
FIG. 2 is a cross-section of the fractured folder blank in which the cross-sectional thickness is enlarged for greater clarity.
Figure 3:
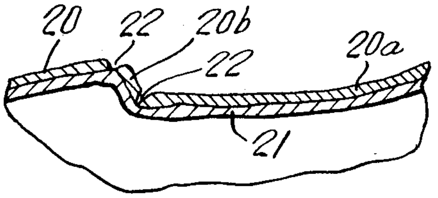
FIG. 3 is an enlargement of a section taken along line 15—15 of FIG. 1, showing one coating fracture enlarged for the sake of clarity.

Referring to FIGS. 1, 2 and 3, the folder is composed of a single blank of fibrous paperboard 17 coated on both sides with a coating 20 fractured according to the invention. The blank is cut as at 13 and creased as at 14 to provide the shape and parts of the blank, namely panels 10 and flaps 11. In FIG. 1, the fractures are indicated at 12. In FIG. 2, a cross-section of fibrous paperboard 17 is shown with coating 20 on both surfaces. In FIG. 3, (an enlarged cross-section 15—15 of FIG. 1) one fracture is shown wherein the coating is **20, 20*a* and 20*b*, the outer ply of the multiply fibrous paperboard is 21 and the air voiding fractures are 22.**

In accordance with the invention, the coated board fractures have a width and spacing such as to give a preferred air permeability of 600 to 1800 seconds per 100 milliliters using the Gurley Densometer in accordance with TAPPI standard No. T-460 os 68. This degree of permeability is usually associated with fracture spacings of four to six to the inch. Besides the fracture spacing, air permeability is also influenced by the uncoated board rigidity in that fracture width increases with the rigidity.

Figure 4:
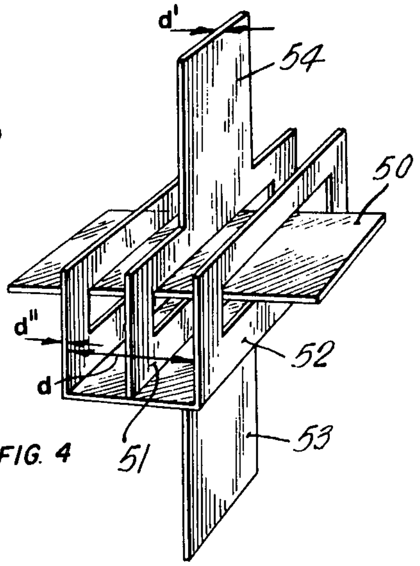
FIG. 4 is a perspective view of a rigidity test piece holder.

The minimum and maximum rigidities for the required width of fracture are preferably 16 to 23 units in the grain direction measured on the uncoated board in accordance with TAPPI standard procedure No. T-469 sm 55 modified by a loading device for use with a Schopper tensile tester, the device as shown in FIG. 4. It comprises a top stirrup 51 with tang 54 for clamping by the top jaw of the tensile tester and a bottom stirrup 52 with tang 53 for clamping by the bottom jaw of the tester.

The uncoated board test sample size is 2½ inches in the grain direction of 1 inch in the cross-direction. The span distance d of the bottom stirrup is 1 3/16 inches and the thickness of the top and bottom stirrups d' and d'' respectively is 1/16 inch. In carrying out rigidity tests, the uncoated board test sample 50 is inserted through the stirrup openings and the tensile tester is then activated. The speed of the tester bottom jaw is 4 inches per minute. The test is run until the coated board sample cracks along its line of contact with the upper stirrup at which time the maximum rise of the tester pendulum arm occurs. No weight is used on the arm and the rigidity reading is taken on the lower scale of the pendulum arc.

The fineness of the fractures combined with the imperviousness of the coating material, the hard sizing of the board substrate, and the surface tension of water, prevent water being expressed along with the air through the fractures.

To prevent the folders softening after filling with fish fillets, and to prevent the fillets from sticking to the softened areas after freezing, the fibrous board is preferably hard-sized to a level less than 32 grams per square meter (2 minutes) as measured by TAPPI Cobb test standard No. T-441 os 69. The interior of the board should be sized to the same degree as the surfaces. The board is preferably 18 to 23 thousandths of an inch thick. The porosity (or air permeability) of the board before coating is preferably in the range 400 to 700 seconds per 100 milliliters measured as previously described. The porosity of the coated board before fracturing is in the area of 20,000 seconds per 100 milliliters. This is changed as noted previously to the range 600 to 1800 seconds per 100 milliliters by the fracturing process. Preferred levels within this Gurley Densometer range can be realized by the proper combination of board rigidity and the number and diameter of fracturing rolls. Coated board temperature in the range to 5° to 80°F during fracturing has no significant influence on porosity. Suitable board grades are container chip, white lined container back and the like.

The impermeable coating material is a wax blend which may contain one or more of the following: low molecular weight polyethylene, high melting point microcrystalline wax, hard synthetic wax and high melting point paraffin. The preferred coating weight is 13 to 16 lb. per 3000 square feet of folder face.

Generally the finished folder is 26⅝ inches in length by 23½ inches in width but may have dimensions different from these.

Figure 5:
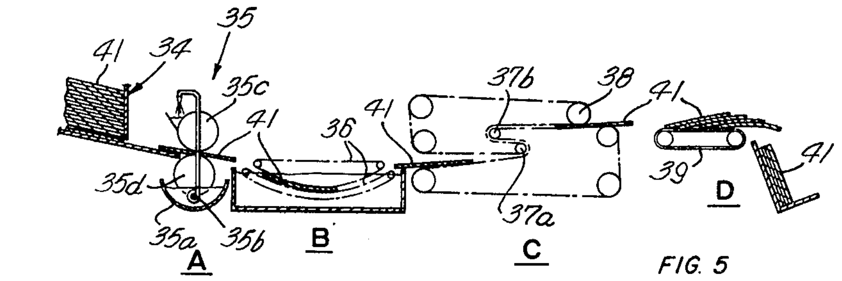
FIG. 5 is a schematic flow-sheet illustrating, in sequence, the principal process steps for making the packaging folder.

FIG. 5 is a schematic flow-sheet type drawing showing the principal process steps in sequence - coating, chilling, fracturing and curl removal. The wax coating unit A comprises a feed station 34 and an applicator station 35 which is made up of top and bottom applicator rolls **35*c* and 35*d* respectively which are used for applying wax supplied by feed tank 35*a* and pump 35*b*. The cold water chilling unit B includes conveyor belts 36 which receive blanks from the wax coating unit A and convey them below the surface of the water in the tank 36*a* and deliver them to the fracturing unit C. The fracturing unit C includes fracturing rolls 37 and a curl removal roll 38. A stacking arrangement D including a stacking conveyor 39 facilitates the collection of the finished folders for casing. Folder blanks 41 are shown at several points in their passage through the process from the feeding station 34** to the stacking station D.

Figure 6:
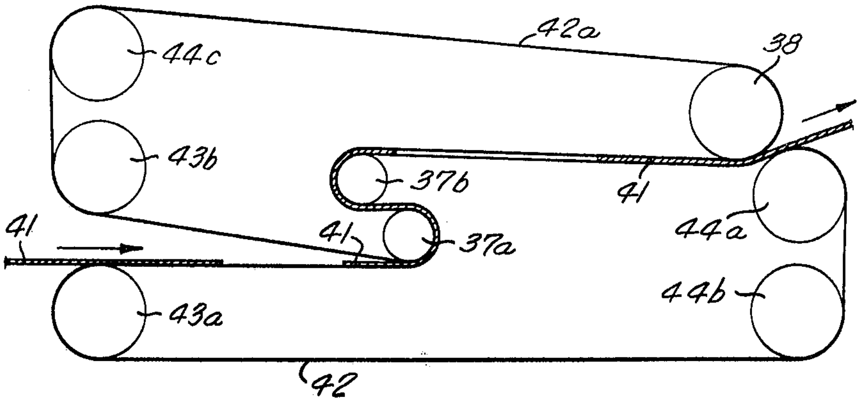
FIG. 6 shows schematically one type of apparatus for flexing the waxed folder blanks to produce micro-fractures in the coating.

The feeding, waxing, chilling and stacking station steps are carried out in a way understood in the art. The novelty of the process lies in the added step of flexing the waxed folder blanks to produce the micro-fractures in the wax coating which permit egress of air as shown schematically in FIG. 6. It should, however, be understood that this fracturing step may be done by other means. For instance, the folder may be drawn over the stationary, smooth, rounded edge, for example that of a thin plate. However, applicant finds an apparatus shown in FIG. 6 to be a convenient way of performing the wax fracturing step of the process.

The parts of the fracturing unit and their functions in producing fractured folders are as follows. The folder 41 is projected by the delivery rolls of the chilling unit B shown in FIG. 5 onto the bottom conveyor belt 42 of the fracturing unit. The bottom conveyor belt 42 carries the folder to the first fracturing roll **37*a* where both bottom 42 and top 42*a*** conveyor belts converge to sandwich the folder and constrain it to follow a course through the train of fracturing rolls 37*a*, 37*b* thence to the curl removal roll 38 from where it is delivered to the stacking conveyor 39 as shown in FIG. 5. The bottom conveyor 42 after delivery of the folder is returned to the bottom drive roll 43*a* by two idler rolls 44*a*, 44*b*. Similarly, the top conveyor 42*a* is returned to the top driving roll 43*b* by the curl removal roll 38 and the top idler roll 44*c*. The belt tension, and hence the tension on the folder as it passes around the fracturing rolls, is controlled by vertical and horizontal adjustment of the idler rolls 44*a*, 44*b*, 44*c*. This entire fracturing unit is powered from a 5HP motor by chain and sprocket to the driving rolls 43*a*, 43*b*.

Figure 7:
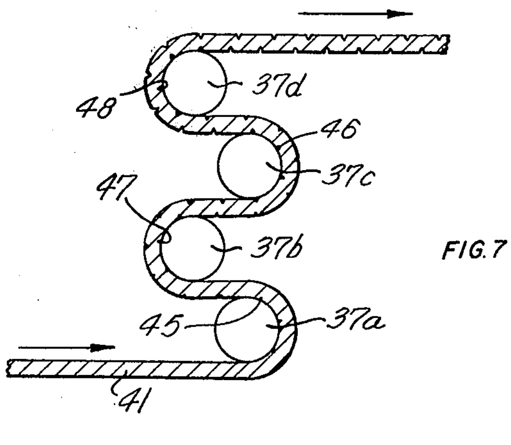
FIG. 7 shows the development of the micro-fractures as the folder progresses through the fracturing roll system.
Figure 8:
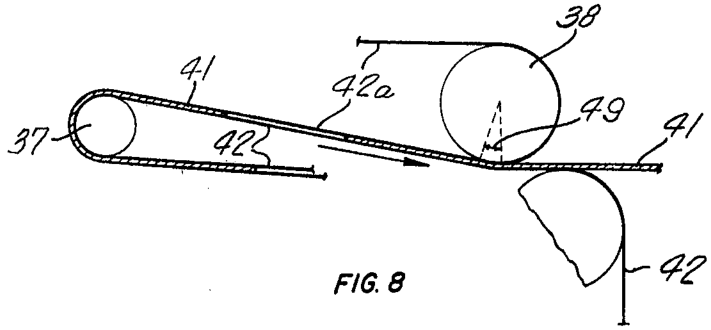
FIGS. 8 and 9 show variants of the fracturing roll system for different levels of treatment.
Figure 9:
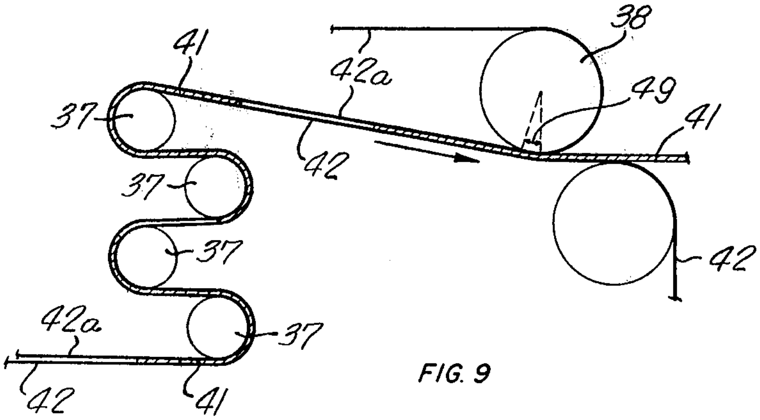

FIGS. 7, 8 and 9 illustrate diagrammatically the fundamentals of the process performed on the folder.

FIG. 7 shows how the micro-fractures are developed as the folder progresses through the fracturing roll system. To simplify the drawing, the top and bottom folder conveyor belts have been omitted. As the folder is carried around the first roll 37*a*, fine fractures 45 are formed on the concave surface. These compression fractures can be widened by subsequent passage, with the same surface in the concave position, around the third roll 37*c*. The widened compression fractures are indicated at 46. The opposite surface of the folder similarly is fractured as it passes in the concave position around the second and fourth fracturing rolls 37*b*, 37*d*. The resultant fine and widened compression fractures, as shown at the second and fourth rolls, are marked 47 and 48 respectively.

FIGS. 8 and 9 show variants of the fracturing roll system for different levels of treatment. In both Figures, fracturing rolls 37, folders 41, bottom conveyor belt 42 and top conveyor belt 42*a* are indicated. The curl removal roll is marked 38. The folders wrap around the roll 38 approximately 20° to 25°, as indicated by the section 49.

Preferred embodiments of the process which yield the desired fractured folder permeability of 600 to 1800 sec. per 100 milliliters Densometer range, use two pairs of fracturing rolls. The preferred arc of wrap of the folder around the fracturing rolls is 60° to 180°. Processing of the folders through the roll system is necessarily in the grain direction since coated board rigidity in the cross grain direction is too low to accomplish the required degree of fracturing. The diameter of the fracturing rolls is preferably 1 inch. The diameter of the curl removal roll and the arc of wrap of the folder around the roll are preferably 3 inches and 20° to 25°, respectively. The diameters of all other rolls are not critical other than being of a diameter which does not flex appreciably under the belt tension. The roll surfaces and conveyor belt surfaces are preferably such as to provide a good mutual coefficient of friction. The fracturing rolls are spaced apart to prevent serious damage to the unit in case of a folder jam in the fracturing roll area. The width of the conveyor belts and the face of the rolls are the same dimension, namely 30 inches. This dimension accomodates all folder sizes. The conveyor belts have a preferred design to meet the needs of the fracturing process. Such a design requires a high ratio of horse power transmission capacity over thickness along with substantial flex fatigue resistance. The belt should have sufficient surface friction to grip the folders so that the latter cannot turn away from the grain direction in their passage through the fracturing unit. The belts should be flexible enough to bend repeatedly around the 1 inch diameter rolls and still provide an economical service life. One example of such belts is a 0.04 inch thick endless Habasit TU 6 green synthetic molded belt. Another is a 0.02 inch thick 72 mesh Monoflex Synthetic Monofilament Endless fabric such as is used on the wet end of paper machines.

The character and degree of fracturing are not significantly affected by machine speed. Hence any speed that suits the design strengths of the unit and the economics of the operation may be used.

EXAMPLE

A folder according to the invention is made up of the following:

Board 23 thousandths thick Container Chipboard having a Gurley porosity reading of 500 seconds per 100 milliliters (TAPPI T-460 os 68), a Rigidity of 20 units in the grain direction (TAPPI T-469 sm 55) and a Cobb size test of 25 grams per square meter internally and externally (TAPPI T-441 os 69).

Impermeable Coating - Blend of:

15% low molecular weight polyethylene

15% 160°F. melting point hard microcrystalline wax

5% Paraflint synthetic wax, a saturated straight chain paraffin having a molecular weight of 750 and a melting point of 264°F, supplied by Moore & Munger, Stamford, Connecticut.

½% Release Agent (Armid O), an oleamide having the formula $C_{17}H_{33}CONH_2$, supplied by Armor Industrial Chemicals Co., Chicago, Illinois.

64½% 155°F. melting point paraffin

This composition is only an example and it is understood that variations can be made to suit circumstances.

Fractures:

Extending over both faces of the coated folder at a spacing of approximately 4 to 6 per inch in a direction across the grain of the folder board and giving a Gurley porosity of 600 to 1800 seconds per 100 milliliters.

We claim:

1. A folder comprising a fibrous paperboard body covered on both faces by compression-fracturable, wax-blend coatings which are substantially impervious to water and water vapour, each of said coatings having a large number of compression micro-fractures rendering the folder pervious to air but substantially impervious to water.

2. A folder as defined in claim 1, wherein the number and width of said compression micro-fractures are such that the folder has a porosity within the limits of 600 to 1800 seconds per 100 milliliters as measured by a Gurley Densometer in accordance with TAPPI procedure No. T-460 os 68.

3. A folder as defined in claim 1, wherein said compression micro-fractures are substantially parallel to one another with an average spacing of 4 to 6 fractures per inch.

4. A folder as defined in claim 1, made from a fibrous paperboard having a rigidity in the grain direction of 16 to 23 units as measured by TAPPI procedure No. T-469 sm 55 modified by a loading device for use with a Schopper tensile tester, said rigidity being measured on the paperboard before application of the coatings.

5. A folder as defined in claim 1, made from a fibrous paperboard sized to a Cobb test of less than 32 grams water absorption per square meter (2 min.) with the interior plies being substantially as well sized as the surfaces, the Cobb test being measured in accordance with TAPPI procedure No. T-441 os 69, on the paperboard before application of the coatings.

6. A folder comprising a fibrous paperboard body, said body having a rigidity in the grain direction of 16 to 23 units as measured by TAPPI procedure No. T-469 sm 55 modified by a loading device for use with a Schopper tensile tester, said fibrous paperboard body being sized to a Cobb test of less than 32 grams water absorption per square meter (2 min.) with the interior plies being substantially as well sized as the surfaces, the Cobb test being measured in accordance with TAPPI procedure No. T-441 os 69, said fibrous paperboard body being covered on both faces by compression-fracturable, wax-blend coatings which are substantially impervious to water and water vapour, each of said coatings having compression micro-fractures rendering the folder pervious to air but substantially impervious to water, the number and width of said compression micro-fractures being such that the folder has a porosity within the limits of 600 to 1800 seconds per 100 milliliters as measured by a Gurley Densometer in accordance with TAPPI procedure No. T-460 os 68, said compression micro-fractures being substantially parallel to one another with an average spacing of 4 to 6 fractures per inch.

* * * * *